Sept. 10, 1929.   C. P. CARNEY   1,727,747
DOUGH CUTTER
Original Filed Oct. 6, 1925   2 Sheets-Sheet 1
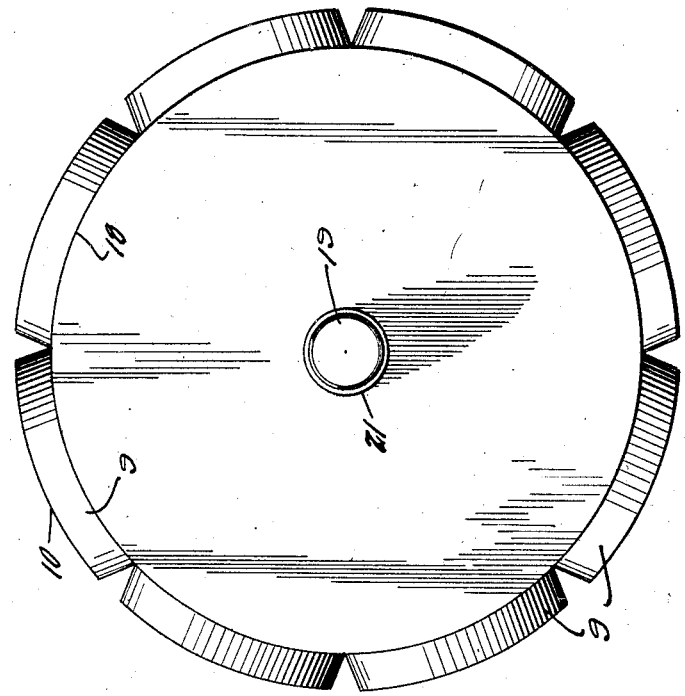
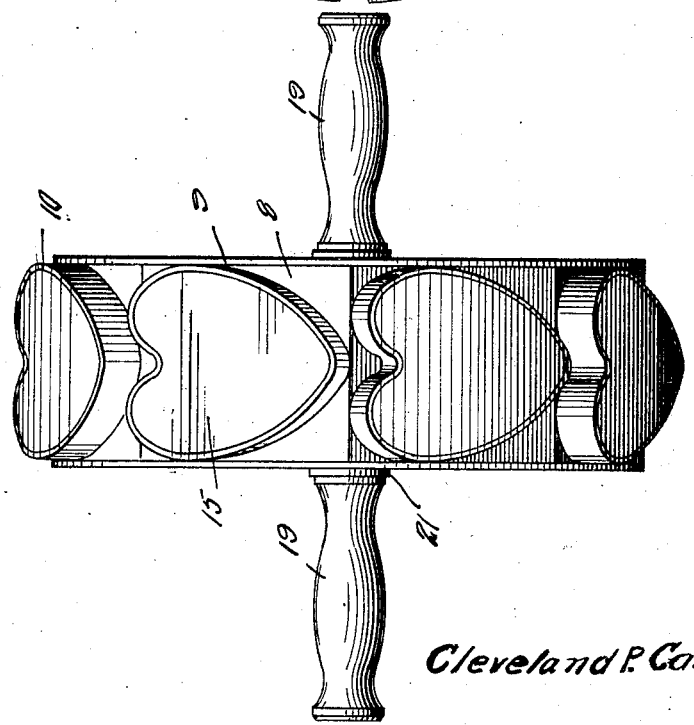
Inventor
Cleveland P. Carney
By
Attorneys Sept. 10, 1929.                C. P. CARNEY                1,727,747
                                DOUGH CUTTER
                   Original Filed Oct. 6, 1925    2 Sheets-Sheet 2
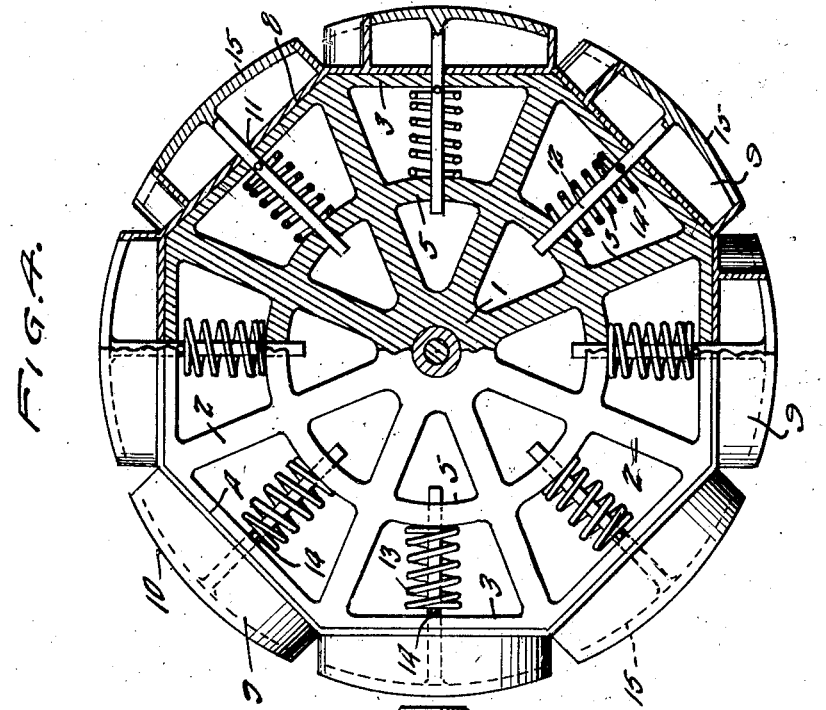
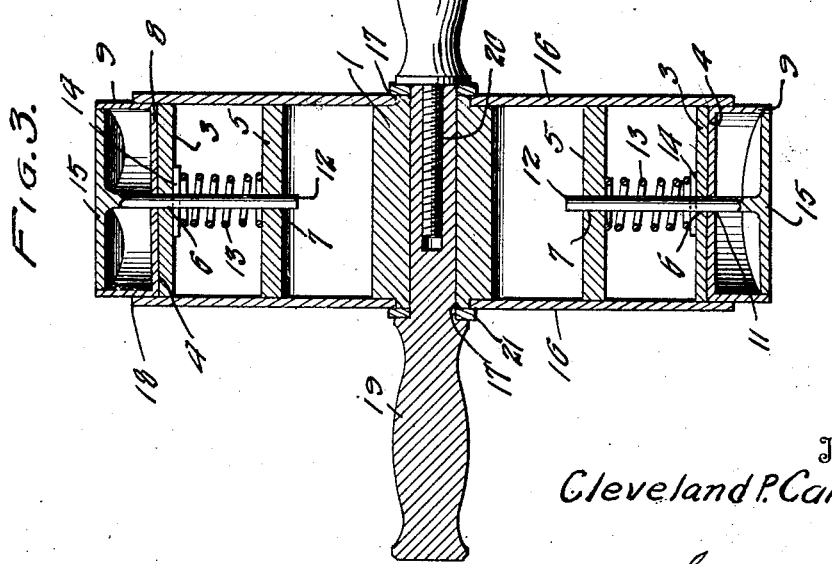
Inventor
Cleveland P. Carney
By
Attorneys Patented Sept. 10, 1929.

1,727,747

UNITED STATES PATENT OFFICE.

CLEVELAND P. CARNEY, OF CHICAGO, ILLINOIS, ASSIGNOR TO CALUMET BAKING POWDER COMPANY, OF CHICAGO, ILLINOIS, A CORPORATION OF ILLINOIS.

DOUGH CUTTER.

Application filed October 6, 1925, Serial No. 60,834. Renewed January 21, 1929.

This invention relates to dough cutters.

An object of this invention is to provide a dough cutter designed particularly for cutting cakes and cookies.

Another object of this invention is to provide a dough cutter, for cutting cakes and cookies, having a plurality of cutting dies equipped with ejectors or spring actuated plungers for ejecting the dough from the cutting dies.

Another object of this invention is to provide a dough cutter comprising a roller having a polygonal rim mounted upon which is a polygonal band, each face of which is provided with a cutting die, the band with the die mounted thereupon being removable and interchangeable with other bands carrying dies of different designs.

A further object of this invention is to provide a dough cutter for cutting cakes and cookies which is highly efficient in operation, yet of marked simplicity as a whole and in respect to each of its component parts, so that its manufacture is economically facilitated both as regards to the parts and their assembly.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification:

Figure 1 is a side elevation of the complete device;

Fig. 2 is an end elevation;

Fig. 3 is a vertical sectional view; and

Fig. 4 is an end elevation with the plate removed and partly in section to better illustrate the mounting of the spring actuated plungers.

Referring by numerals to the drawings, 1 represents a sleeve or hub having formed thereupon a plurality of spokes 2 equally spaced with respect to each other. A rim 3 is formed upon the spokes 2. The rim 3 is polygonal in form with its respective faces 4 spanning the distances between the spokes. Thus, the spokes join the rim at the apexes of the polygon.

Formed integral with the spokes 2 intermediate the hub 1 and rim 3 is a web 5. The web 5 is circular in form and connects the respective spokes to each other. Centrally located in each of the faces 4 of the rim 3 is an aperture 6 which registers with an alike aperture 7 in the web 5 between each pair of spokes, the object of which will hereinafter appear.

Mounted upon the rim 3 is a polygonal band 8. The band 8 fits snugly upon the rim 3 and is provided with a plurality of cutting dies 9, arranged one on each of the polygonal faces of the band. The side walls of the cutting dies are arcuate, as shown at 10, so as to present a circular effect when all of the cutting dies have been assembled. The band 8, which carries the cutting dies 9, is made removable and interchangeable with other bands carrying dies of different designs.

In the center of each of the dies 9 is an aperture 11 registering with the apertures 6 and 7 in the rim and web. Mounted in the apertures 6 and 7 are plungers 12 which project through the apertures 11 in the band.

The plungers 12 have mounted thereupon coiled springs 13 intermediate the web and the rim. Each of the springs 13 has one of its ends bearing against the web 5 and its other end secured in a recess 14 in the plunger. Thus, the plungers are normally held in a distended position. The plungers 12 are provided with heads 15 which fit snugly in the dies 9, and conform to the cutting edges.

Since the plungers are normally supported by the springs in a distended position, it necessarily follows that the plunger heads 15 are sustained at the outer or cutting edges of the dies, the object of which will hereinafter appear.

Mounted upon each side of the hub 1 is a circular plate or disk 16 having a central aperture 17 which fits snugly over the hub. The outer edges 18 of the plates 16 bear against the sides of the rim 3, the area of the plate being sufficient to completely house or enclose the ends.

The plates 16 are clamped in position by the oppositely disposed handles 19 mounted in the hub and threaded together by a male and female joint, as shown at 20. Washers 21 are interposed between the clamping ends of the handle and hub. However, these washers are by no means essential and may be omitted without materially affecting the structure and the operation of the device.

Operation: Assuming that the cutter has been assembled for cutting the desired form of cake or cookie, and that the cake dough has been rolled to the desired thickness, the cutter is then grasped by the handles and rolled across the dough in the same manner as a rolling pin. As a cutting die contacts with the dough, the spring actuated ejector is forced up or down into the die toward the bottom thereof, where it is held by the pressure of the dough, between the ejector head and the cutting board, until the cutting die has completed its operation. Simultaneously with the cutting die completing its operation and the withdrawal of the die from the dough due to the revolving of the cutter in its course of travel, the ejector returns to its normal position, and in doing so, ejects the cake or cookie thus cut.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

Having thus described the various features of my invention, what I claim and desire to secure by Letters Patent is:

1. A dough cutter comprising a wheel having a polygonal rim, a demountable polygonal band upon the rim, a cutting die upon each face of the polygonal band, and means for rotating the wheel.

2. A dough cutter comprising a wheel having a polygonal rim, a removable band upon the rim, a plurality of arcuate cutting dies upon the band, ejectors mounted in the dies, arcuate cutting heads upon the ejectors and means for rotating the wheel.

3. A dough cutter comprising a wheel, a polygonal rim upon the wheel, a removable polygonal band upon the rim, cutting dies upon the band, arcuate cutting edges upon the dies, ejectors in the dies, arcuate heads upon the ejectors conforming to the arcuate cutting edges of the dies and handles for rotating the wheel.

4. In a dough cutter, an endless band, the band being in the form of a polygon, a cutting die upon each face of the polygon, arcuate cutting edges upon the dies and ejectors having arcuate heads mounted within the dies.

5. A dough cutter comprising a polygonal wheel, a removable polygonal band upon the rim of the wheel, a cutting die upon each face of the polygonal band, spring actuated pistons adapted to reciprocate in the cutting dies, the pistons being mounted in the wheel and extending through the faces of the band, and means for rotating the wheel.

6. A dough cutter comprising a polygonal wheel, a removable polygonal band upon the rim of the wheel, an arcuate cutting die upon each face of the polygonal band, piston rods mounted in the wheel and extending through each face of the band into the dies, heads upon the pistons conforming to the interior of the dies, and means for rotating the wheel.

7. A dough cutter comprising a wheel having a hub, a plurality of spokes, a polygonal rim, a web connecting the spokes intermediate the hub and rim, a removable polygonal band upon the rim, an arcuate cutting die upon each face of the polygonal band, piston rods mounted in the web and band between each pair of spokes, springs mounted upon the piston rods between the web and rim, heads upon the piston rods within the dies, and means for rotating the wheel.

8. A dough cutter comprising a wheel having a hub, a plurality of spokes radiating from the hub, a web connecting the spokes, a polygonal rim upon the spokes, arcuate cutting dies mounted upon the faces of the polygonal rim, and means mounted in the hub for rotating the wheel.

9. A dough cutter comprising a wheel having a hub, a plurality of spokes radially disposed on the hub, a circular web connecting the spokes, a polygonal rim upon the spokes, arcuate cutting dies upon the polygonal rim, plungers mounted in the web and polygonal rim between the spokes, heads upon the plungers adapted to reciprocate within the cutting dies, and a detachable handle mounted in the hub.

10. A dough cutter comprising a wheel having a hub, a plurality of spokes radially disposed on the hub, a web connecting the spokes, a polygonal rim mounted upon the spokes, a removable band upon the rim, arcuate cutting dies mounted on the band, plungers mounted in the web and faces of the polygonal rim centrally between the spokes, springs mounted upon the plungers between the web and the rim, heads upon the plungers fitting snugly in the cutting dies, disks upon the ends of the rollers, and a detachable handle journaled in the hub.

11. In a dough cutter, a polygonal wheel, interchangeable endless bands carrying cutting dies upon their outer peripheries, adapted to be removably mounted upon the wheel, and means for ejecting the contents of the dies.

In testimony whereof I affix my signature.

CLEVELAND P. CARNEY.